United States Patent [19]
McNeil

[11] Patent Number: 5,490,744
[45] Date of Patent: Feb. 13, 1996

[54] METHOD AND APPARATUS FOR INFLATING AND CURING A RESIN IMPREGNATED MANHOLE LINER

[76] Inventor: Ronald A. McNeil, 5413 Parkview Rd., Graceville, Fla. 32440

[21] Appl. No.: 162,916

[22] Filed: Dec. 8, 1993

[51] Int. Cl.⁶ .................................................. E02D 29/12
[52] U.S. Cl. ...................... 405/303; 156/287; 156/294; 405/133; 405/155; 405/150.1; 138/97
[58] Field of Search .......................... 405/52, 154, 156, 405/150.1, 303, 133, 155, 146; 156/71, 287, 294

[56] References Cited

U.S. PATENT DOCUMENTS

| | | | |
|---|---|---|---|
| 1,369,151 | 2/1921 | Winterrath . | |
| 3,511,734 | 5/1970 | Darrow | 156/287 |
| 3,769,144 | 10/1973 | Economy et al. | 161/50 |
| 4,009,063 | 2/1977 | Wood | 156/71 |
| 4,135,958 | 1/1979 | Wood | 156/199 |
| 4,182,262 | 1/1980 | Everson et al. | 118/44 |
| 4,256,525 | 3/1981 | Allen | 156/245 |
| 4,640,313 | 2/1987 | Stanley | 138/141 |
| 4,714,095 | 12/1987 | Müller et al. | 138/98 |
| 4,762,585 | 8/1988 | Schneider et al. | 156/294 |
| 4,776,370 | 10/1988 | Long, Jr. | 138/98 |
| 4,778,553 | 10/1988 | Wood | 156/287 |
| 4,836,715 | 6/1989 | Wood | 405/150 |
| 4,846,822 | 7/1989 | Foxman | 604/370 |
| 4,861,634 | 8/1989 | Renaud | 428/36.1 |
| 4,956,041 | 9/1990 | Miyazaki et al. | 156/267 |
| 4,965,036 | 10/1990 | Miyazaki et al. | 264/269 |
| 4,994,317 | 2/1991 | Dugan et al. | 428/246 |
| 5,106,440 | 4/1992 | Tangeman | 156/94 |
| 5,225,121 | 7/1993 | Yokoshima | 156/287 X |
| 5,256,367 | 10/1993 | Cornish et al. | 156/287 X |
| 5,265,981 | 11/1993 | McNeil | 405/303 |
| 5,308,192 | 5/1994 | Srackangast | 405/154 |

FOREIGN PATENT DOCUMENTS

| | | |
|---|---|---|
| 0592115 | 9/1993 | European Pat. Off. . |
| 2113608 | 8/1983 | United Kingdom . |

Primary Examiner—Dennis L. Taylor
Attorney, Agent, or Firm—Joseph W. Berenato, III

[57] ABSTRACT

An apparatus and method for inflating and curing a resin impregnated liner include a resin impregnated liner lowered into an underground structure so that a portion of the liner extends beyond the structure. The protruding portion of the liner is then sealed. Pressurized air and steam are simultaneously admitted into the liner so that the liner inflates and engages the structure. Air and steam continue to be admitted into the liner for a period sufficient to cure the resin while maintaining the liner engaged with the structure.

19 Claims, 2 Drawing Sheets

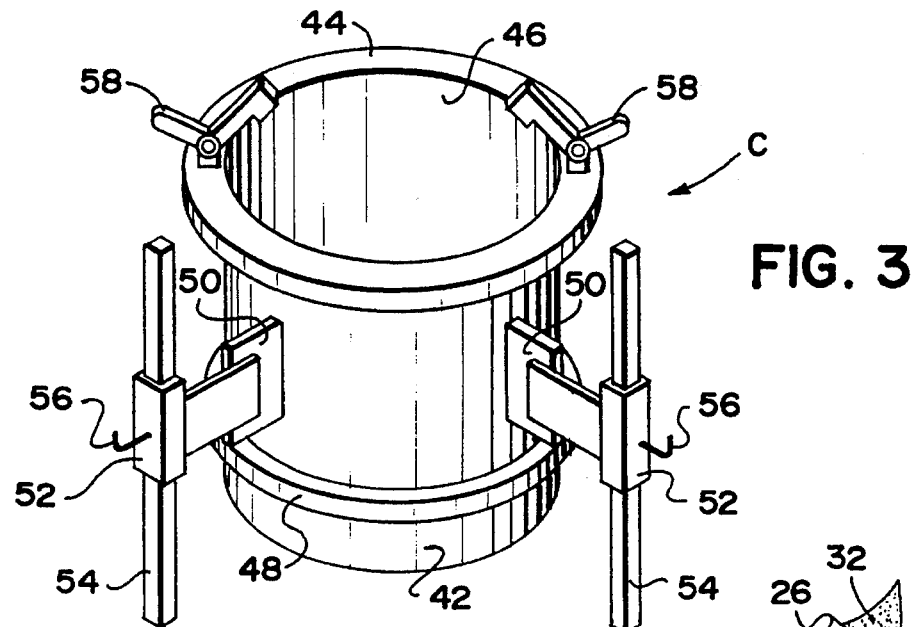
FIG. 3
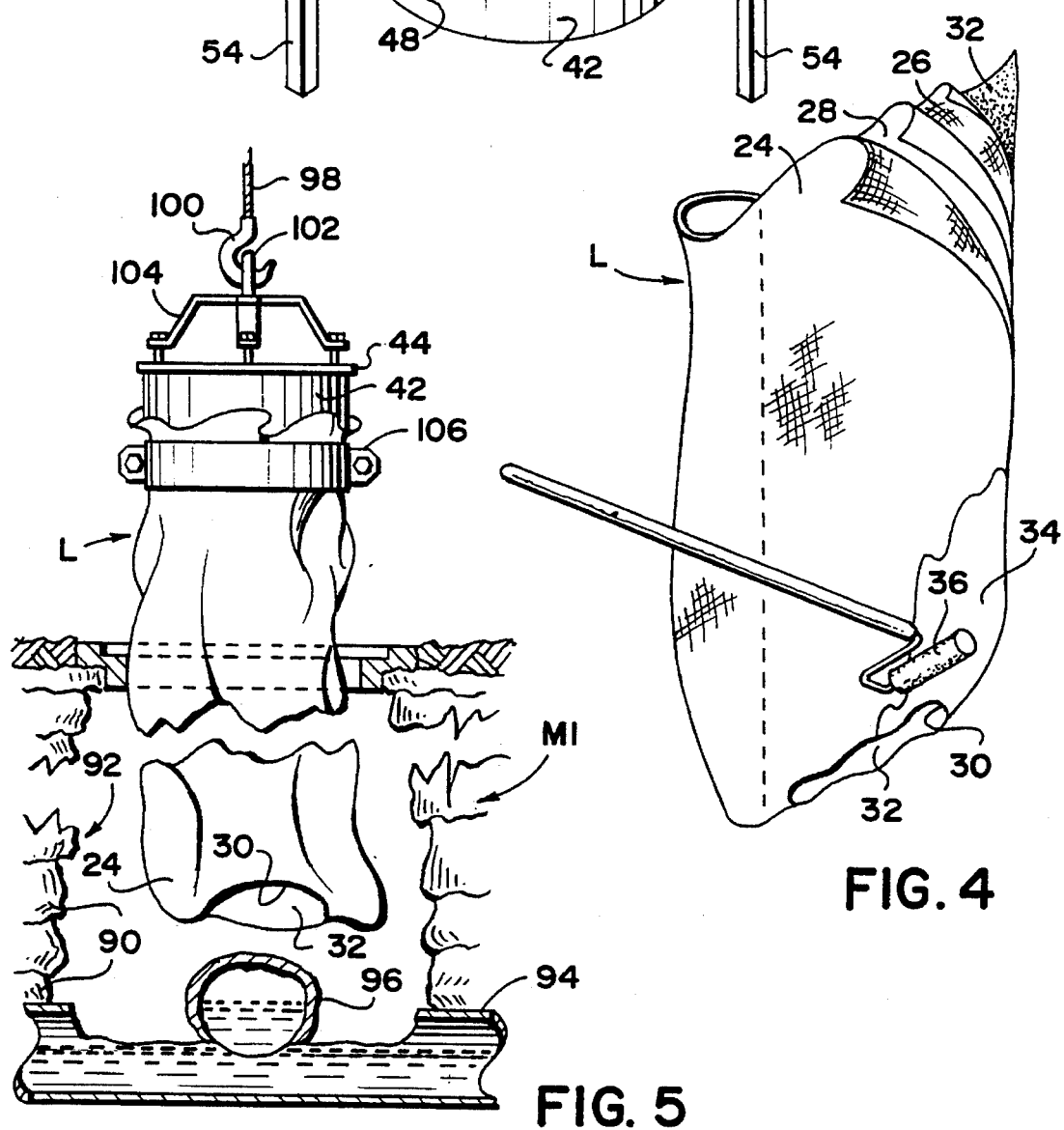
FIG. 4
FIG. 5

METHOD AND APPARATUS FOR INFLATING AND CURING A RESIN IMPREGNATED MANHOLE LINER

FIELD OF THE INVENTION

The disclosed invention is directed to a method and apparatus for inflating and curing a resin impregnated liner user for rehabilitating and reinforcing an underground manhole. More particularly, the disclosed invention is directed to a method and apparatus for simultaneously introducing through a common conduit pressurized, heated air and steam into a resin impregnated liner, so that the liner inflates and engages the walls of the manhole and after which the liner is cured for reinforcing and rehabilitating the manhole.

BACKGROUND OF THE INVENTION

Underground manholes and the like are frequently formed from brick, cement, and like cementitious and/or refractory materials. The manhole usually has a relatively long neck portion extending from the surface, and terminating in a lower sometimes flaring portion to which a sewer pipe communicates. The sewage flowing through the sewer pipe may, over time, damage the mortar which secures the bricks of the manhole together, or the cement with which the manhole is formed. Damage to the bricks and cement will permit ground water and subsurface water to infiltrate the manhole, with the result that the water treatment plant may become overloaded and unable to handle the amount of water which it receives during rain and other such occurrences. In that event, either untreated water is uncontrollably discharged, or the water treatment plant itself becomes unable to perform its function and needs to be taken out of service.

Replacement of a manhole is a relatively expensive undertaking, because of the need to excavate the surrounding soil, and remove the bricks and other materials. In addition, the sewer itself must continue to be usable during the procedure, or else homes and businesses will be unable to flush toilets, run taps, etc. For this reason, it is desireable to rehabilitate and/or reinforce the manhole in a way which avoids a need for replacement.

My prior patent, U.S. Pat. No. 5,265,981, issued Nov. 30, 1993, the disclosure of which is incorporated herein by reference, discloses a method and apparatus for rehabilitation a manhole through use of a resin impregnated fiberglass liner which is inflated and cured in place while permitting the manhole to remain in service as it is being rehabilitated. That patent discloses the use of heated air to inflate the liner so that the surrounding walls of the manhole are engaged, after which the resin cures and secures the liner to the walls of the manhole. I have found that heated air can take a relatively long period to achieve sufficient resin cure. Particularly for deep manholes, the walls of the manhole and the surrounding soil act as a heat sink which tends to cool the resin, so that additional time for curing is required because the surrounding material also must be heated somewhat.

In view of the above, those skilled in the art will understand that there is a need for a method and apparatus which inflates the manhole liner and achieves cure of the resin more rapidly than may be accomplished through use of heated air alone. The disclosed invention meets these needs through the simultaneous introduction of pressurized, heated air and steam through a common conduit creating an extremely turbulent condition within the inflated liner and causing the inflated liner to resemble a convection oven.

OBJECTS AND SUMMARY OF THE INVENTION

The primary object of the disclosed invention is a method and apparatus for simultaneously introducing pressurized, heated air and steam into a resin impregnated manhole liner to cause the liner to inflate and engage the walls of the manhole, after which the resin is relatively rapidly cured so that the manhole is reinforced and/or rehabilitated.

An apparatus for inflating and curing a liner according to the invention includes an inflation canister having a top plate and a cylindrical neck extending therefrom. The neck is attachable to a liner which is to be inflated and cured within the manhole. A first conduit is secured to the top plate and therethrough communicates with the neck. The conduit includes means for simultaneously permitting pressurized air and steam to flow therethrough and thereby to a liner attached to the neck. A relief valve is operably associated with the plate for maintaining the liner thereafter at a selected pressure.

A method for inflating and curing a resin impregnated liner comprises the steps of lowering a resin impregnated liner into an underground structure so that a portion of the liner extends beyond the structure. The liner portion is then sealed. Pressurized air and steam are then simultaneously admitted into the liner, so that the liner inflates and engages the walls of the structure. Air and steam continue to be admitted into the liner thereafter for a period sufficient to cure the resin while the liner is engaged with the structure.

The method of reinforcing a manhole according to the invention comprises the steps of providing a liner shaped to conform to a manhole to be reinforced. The liner has first and second resin impregnated layers sandwiching an impermeable layer. An impermeable bladder overlies the first layer. The liner is lowered into the manhole, and a portion of the liner extends therefrom. The liner portion is then sealed. Heated, pressurized air and steam are simultaneously admitted into the liner, so that the liner inflates and the second layer engages the walls of the manhole. Heated, pressurized air and steam continue to be admitted into the liner for a period sufficient to cure the resin in the layers.

These and other objects and advantages of the invention will be readily apparent in view of the following description and drawings of the above-described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 3 is a perspective view of the inflation canister of the invention;

FIG. 4 is an exploded assembly view of a liner according the invention; and

FIG. 5 is a cross-sectional view of a liner being lowered into a manhole.

DESCRIPTION OF THE INVENTION

Figure 1:
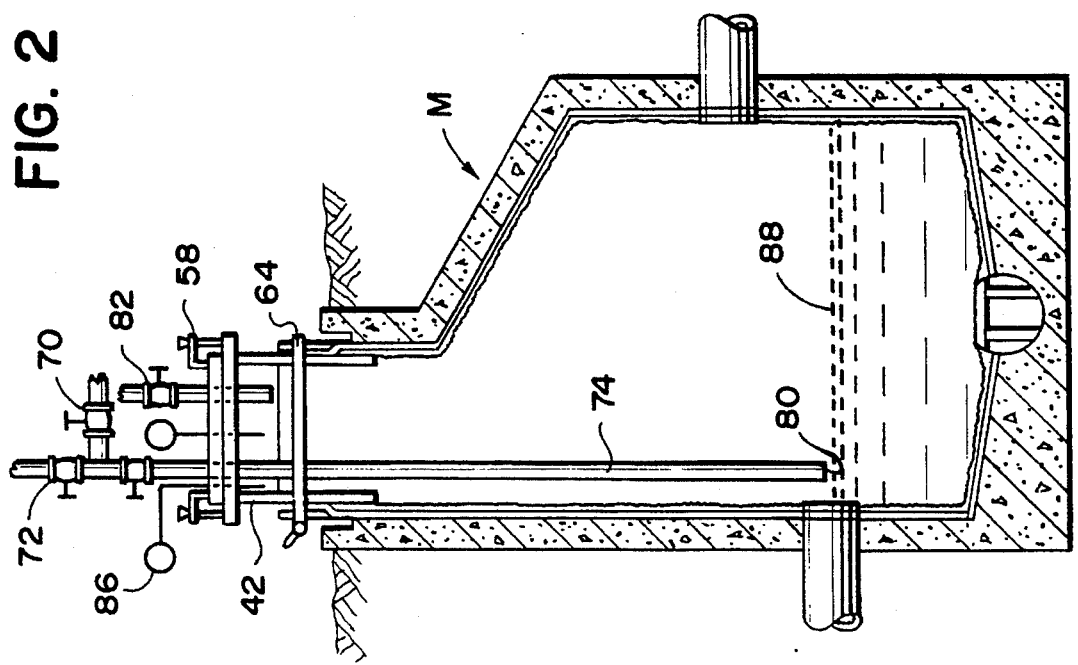
FIG. 1 is a cross-sectional view, partially in schematic, of a liner being inflated and cured within a manhole according the invention.
Figure 2:
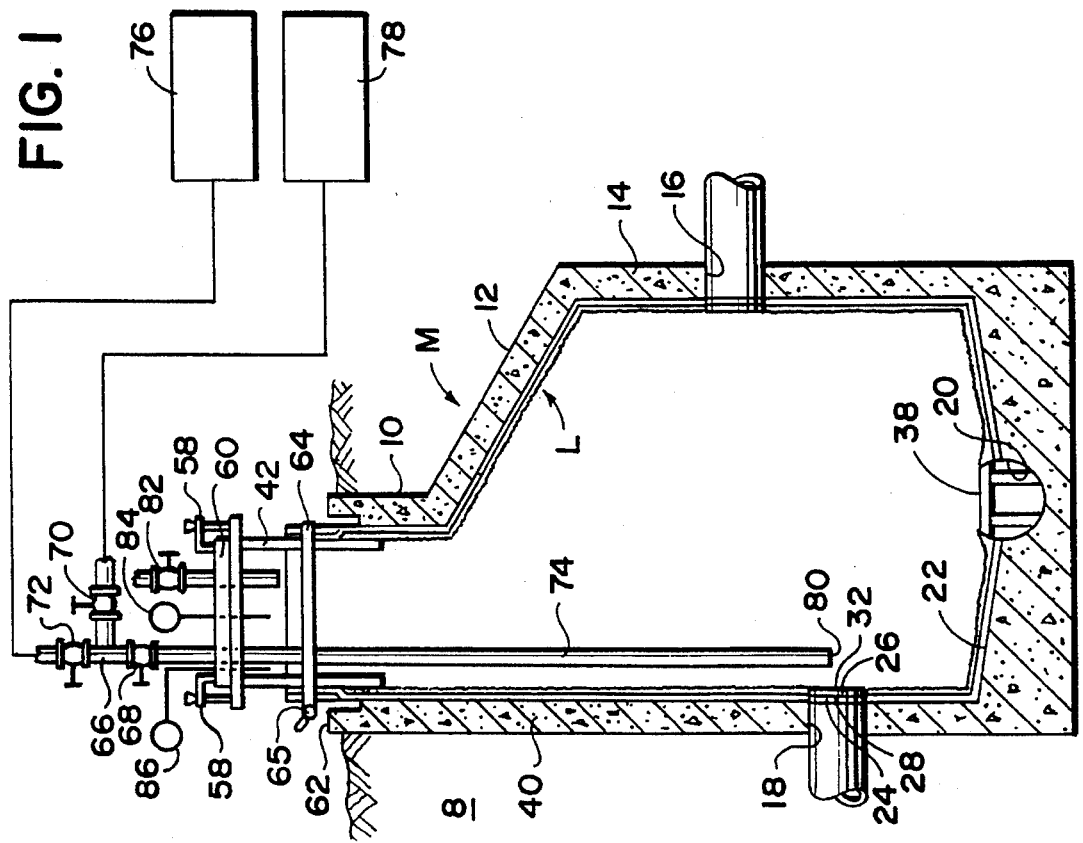
FIG. 2 is a cross-sectional view similar to that of FIG. 1 after the liner has been cured.

Manhole M, as best shown in FIGS. 1 and 2, is formed from a cementitious material and has a wall defining a top portion or neck 10 from which flaring portion 12 and chamber portion 14 extend. Inlets 16 and 18 communicate with chamber portion 14 in order to permit water to flow to the manhole M. Sewer line 20 is formed in floor 22 of manhole M, and permits water and waste materials flowing into manhole M through inlets 16 and 18 to be communicated to a water treatment facility (not shown) for treatment. In addition, sewer line 20 is usually also in communication with other manholes, so that sewage flows from one manhole M to the next until ultimately reaching the treatment facility.

FIG. 4 discloses liner L which is used for rehabilitating and reinforcing manhole M after any of the neck 10, flaring 12 and chamber 14 portions have deteriorated. Liner L includes structural fiberglass layers 24 and 26 which sandwich fluid impermeable layer 28. Layers 24, 26, and 28 have an opening 30 formed therein which corresponds to the shape and dimension of sewer line 20 in floor 22. Bladder 32 is disposed over layer 26 and closes opening 30, and is impermeable to air, water, and like fluids in order to permit inflation of liner L when positioned within manhole M.

I prefer that the fiberglass layers 24 and 26 be impregnated with a two component epoxy resin system, such as disclosed in my prior cited U.S. Pat. No. 5,265,981. The epoxy resin 34 impregnates the woven, structural fiberglass of the layers 24 and 26 and, upon being cured, provides a hard, rigid, reinforcing structure which is secured to the walls of the manhole M. The epoxy resin 34 may be applied to each of layers 24 and 26 through roller 36 or otherwise.

Support 38, as best shown in FIG. 1, is positioned within sewer line 20 to prevent the liner L and the exposed portion of bladder 32 from blocking sewer line 20. Thus, even when the liner L is installed within the manhole M of FIG. 1, sewer line 20 remains open to permit water flow therethrough for treatment. The liner L does, however, close inlet lines 16 and 18 while rehabilitation proceeds, so there may be a need for diversion of water and/or installation during a time of day at which little water flow occurs through the inlets 16 and 18.

Each liner L is manufactured to conform to the shape and dimensions of the particular manhole M which is to be reinforced. Proper reinforcement of the manhole M occurs when the fiberglass layer 24 is pressed against the surrounding wall of the manhole, so that the epoxy resin 34 may bond thereto and so that the rigid cured resin will provide structural reinforcement.

Once the liner L has been manufactured, its layers 24 and 28 are impregnated with the epoxy resin, and it is lowered into the manhole M. Liner L must then be inflated in order to cause the liner to expand. I have found that approximately 500 to about 1500 pounds per square foot of pressure should be applied to force the layers of the liner L against the wall of the manhole M. In addition, the inflation pressure must be sufficient to stop water infiltration at the bottom of the manhole M that may occur due to ground water or other hydrostatic head. Thus, for example, should the vertical wall 40 have water throughout its height, then those skilled in the art will understand that the hydrostatic head of the water proximate the floor 22 may be sufficient to separate the fiberglass layer 24 in that area from the interior of the wall 40 if sufficient inflation pressure is not present. Moreover, sufficient pressure should be available in order to cause the resin 34 impregnating the layer 24 to be forced into the fissures, openings, and gaps in the exposed wall of the manhole M, thus increasing the surface area available for securement.

As best shown in FIG. 3, inflation canister C has a cylindrical neck portion 42 from which upper flange portion 44 radially extends. Opening 46 extends through canister C for reasons to be explained. Protruding bead 48 extends about canister C proximate the lower end of neck 42 in order to minimize the tendency of canister C to be expelled from the liner L during the inflation and curing process.

Brackets 50 extend outwardly from neck 42, and I prefer that there be at least three equiangularly disposed brackets 50. Guides 52 are secured to each of brackets 50 and a vertical leg 54 is moveable relative thereto. Key 56 removably secures each of legs 54 relative to its guide 52 in order to permit the canister C to be set relative to the manhole M while taking into account fluctuation in the surface surrounding neck portion 10.

Clamps 58 are secured to flange portion 44 in order to secure top plate 60 to flange portion 44 so that opening 46 is sealed. I prefer that the top plate 60 be a transparent material, such as Lexan, so that I may observe the liner L during the inflation and curing process. Although only two clamps 58 are disclosed, I provide a sufficient number about the flange portion 44 to keep the top plate 60 in its sealing position. The clamps 58 may be nothing more than a C-clamp, or like clamping device.

Once the liner L has been lowered into manhole M, then a portion of the liner L extends upwardly beyond the top 62 of manhole M. Tensionable belt 64 extends about liner L above bead 48 in order to secure the liner L to the neck 42 of canister C. The tensionable belt 64 may be a webbed belt having a tensioning assembly 65 permitting the belt 64 to be rapidly tightened about the neck 42 for securing the liner L to the canister C. Cooperation of belt 64 with bead 48 prevents canister C from separating from liner L on account of the inflation pressure.

Top plate 60 has a plurality of openings formed therein. T-connector or fitting 66 is secured to a first of the openings in top plate 60, and valve 68 controls the opening. Valves 70 and 72 are provided at the ports of the T-connector 66 in order to control fluid flow therethrough to downpipe 74. Downpipe 74, as best shown in FIG. 1, extends from top plate 60 within liner L, and has a discharge approximately 2–3 feet above the floor 22 of manhole M. Downpipe 74 and T-connector 60 are manufactured from steel pipe, and are sized to permit adequate flow to liner L to cause expansion thereof and curing of the resin 34.

Steam generator 76 is in flow communication with one of the ports of the T-connector 66 in order to provide steam through downpipe 74 to the interior of liner L. The steam injector 76 should create steam having a temperature of about 300° F., well above the boiling point of water, in order to provide wet heat for curing the resin 34 of the liner L. A Karcher Model 950 generator utilizing a 5.9 horsepower motor pumping water under pressure through the boiler has been utilized. Regenerative blower 78 is in flow communication with the other port of T-connector 66 in order to provide heated, pressurized air thereto for introduction into liner L through the discharge 80 of downpipe 74. I prefer the use of a regenerative blower, because the air while being pumped is heated to about 210° F. or more in excess of its incoming ambient temperature. The regenerative blower 78 may be powered by a gasoline engine or an electric motor, so that the blower turns at approximately 7,000 rpm. Centrifugal and positive displacement pumps may also be used to create pressurized air, provided that heat inversion and high injection velocity are achieved.

Because the steam from steam generator 76 and the heated, pressurized air from the blower 78 are each introduced to T-connector 66, then same mix together and are injected into the liner L through the discharge 80. Because of the downpipe 74, a fast moving column of a hot, pressurized steam/air mixture is created, with the temperature of the column typically reaching 270° F. or more. The injection of heated, pressurized air and steam through the common downpipe 74 creates a very turbulent environment within the interior of the liner L, with the result that the hot pressurized steam/air mixture communicates throughout the entirety of the inflated liner L for applying penetrating heat to the resin 34 impregnating the layers 24 and 26. Because of the mass of the water in the steam, then substantially more heat is injected per unit time into the liner L for curing purposes than could be accomplished through use of air alone. Because of the air, however, the relatively heavy steam propagates throughout the liner L while also causing the liner L to be inflated so that the resin impregnated layer 24 presses against the interior of the manhole M. The combination of the heated, pressurized air and the steam creates a convection oven which significantly improves the curing process, and overcomes the tendency of the soil S surrounding the manhole M from cooling the resin. Thus, the resin 34 impregnating the fiberglass layers 24 and 26 more rapidly cures than is otherwise available. I have found that complete resin cure with the steam/air mixture is about four times faster than using air alone and about twice as fast as using steam alone.

As noted earlier, I regulate the inflation pressure within the liner L sufficient to inflate the liner L and prevent water infiltration into the manhole M. Relief valve 82 communicates with opening 46 in neck 42 through top plate 60. The relief valve 82 may be a manually operable valve which is opened and closed in response to the pressure indicated on the pressure gauge 84, or it may be a valve which is settable. In any event, relief valve 82 causes pressurized air and/or water vapor to be exhausted from the liner L, so that additional heated, pressurized air and steam may be supplied thereto. FIG. 1 also discloses temperature gauge 86 which monitors the temperature within the oven-like retort created within the liner L.

I prefer that the discharge 80 of downpipe 74 be set approximately 2–3 feet above floor 22 of manhole M. Due to natural convection processes, condensate will accumulate on bladder 32 due to water in the steam giving up its heat to the surrounding layers, walls, and soil. The water naturally will have a temperature of no more than the boiling point of water, and I prefer that the resin be cured to a temperature of at least 200° F. Placing the discharge 80 above the surface 88 of any accumulated condensate, as best shown in FIG. 2, will minimize any further cooling of the steam as may occur due to the steam being injected into the water. In addition, placing the discharge 80 above the surface 88 will naturally create turbulence within the condensate due to the high velocity of the air/steam mixture This helps to create a moist, penetrating heat within the liner L.

FIG. 5 illustrates use of the invention for reinforcing and rehabilitating a brick manhole M1. Manhole M1 has bricks 90 arrayed in a series of courses, with the surface 92 thereof having become badly pitted and spalled. Liner L of FIG. 5 corresponds to the liner L of FIG. 4, and has outer fiberglass layer 24, bladder 32, and opening 30 adapted to reinforce the manhole M1 while permitting sewer pipes 94 and 96 to remain in service. It can be seen in FIG. 5 that a crane (not shown) has a cable 98 to which a hook 100 is attached for connection to bracket 102 of lifting assembly 104 secured to flange 44 by bolts. Unlike the tensionable belt 64 of FIGS. 1 and 2, collar 106 may be used to secure the liner L to the neck 42.

After the liner L has been inflated and the resin sufficiently cured in the manholes M and M1 of FIGS. 1 and 5 then the simultaneous injection of heated, pressurized air through blower system 78 and steam from steam generator 76 is terminated. Although I prefer T-connector 66 for permitting steam and air to be admitted to liner L, it is merely necessary that a multiple port fitting or like means for simultaneously receiving the fluids be used. Top plate 60 is then removed by releasing the clamps 58 and canister C is disengaged from liner L. Impermeable bladder 32 is then removed from the liner L for reuse. Once the bladder 32 has been removed, then the portion of the liner L above the surface 62 is trimmed, and the portion of the liner L closing inlets 16 and 18 and to sewer pipe 20 removed. The resin impregnated fiberglass layers 24 and 26 are sufficiently rigid to reinforce the manhole M, and the layer 24 is bonded to the surrounding wall of the manhole M or M1 in order to keep the liner in position and prevent or minimize future spalling. It will be understood that the inner fiberglass layer 26 is relatively impervious to the environment created within the manholes M and M1, so the resulting life should be relatively long and require little maintenance.

While this invention has been described as having a preferred design, it is understood that it is capable of further modifications, uses, and/or adaptations of the invention following the general principle of the invention and including such departures from the present disclosure as come within known or customary practice in the art to which the invention pertains, and as may be applied to the central features hereinbefore set forth, and fall within the scope of the invention of the limits of the appended claims.

What is claim is:

1. Apparatus for inflating and curing a liner, comprising:
    a) an inflation canister including a top plate and a cylindrical neck extending therefrom for attachment to a liner to be inflated and cured;
    b) a first conduit secured to said top plate and communicating with said neck, said conduit including means for simultaneously permitting pressurized heated air and steam to flow thereto and to a liner attached to said canister;
    c) a relief valve operably associated with said plate for maintaining the liner at a selected pressure; and
    d) a downpipe secured to and extending a substantial distance from said conduit for receipt within the liner so that pressurized air and steam supplied thereto may be discharged therein.

2. The apparatus of claim 1, wherein:
    a) said permitting means includes a multiple port connector.

3. The apparatus of claim 2, wherein:
    a) said connector is a T-fitting.

4. The apparatus of claim 1, wherein:
    a) a pressure gauge is operably associated with said top plate.

5. A method for inflating and curing a resin impregnated liner, comprising the steps of:
    a) lowering a liner having a resin impregnated outer surface into an underground structure so that a portion of the liner extends beyond the structure;
    b) sealing the liner portion;
    c) simultaneously admitting pressurized heated air and steam into the liner so that the liner inflates and said outer surface engages the structure; and d) continuing to admit heated air and steam into the liner for a period sufficient to cure the resin while engaged with the structure.

6. The method of claim 5, including the step of:
a) admitting the air and steam through a common conduit.

7. The method of claim 6, including the step of:
a) admitting air which has a temperature above the boiling point of water.

8. The method of claim 6, including the step of:
a) admitting the steam and air at a velocity sufficient to create turbulence thereof within the liner.

9. The method of claim 6, including the step of:
a) positioning the conduit so that the discharge thereof is adjacent the end of the liner opposite the liner portion.

10. The method of claim 9, including the step of:
a) positioning the conduit so that the discharge thereof is no more than three feet above the bottom of the liner.

11. The method of claim 5, including the step of:
a) inflating the liner to a pressure of no less than 500 pounds per square foot.

12. The method of claim 11, including the step of:
a) venting the liner so that the pressure therein maintains a preselected level.

13. The method of reinforcing a manhole, comprising the steps of:
a) providing a liner shaped to conform to a manhole to be reinforced, the liner having first and second resin impregnated layers sandwiching an impermeable layer and an impermeable bladder overlying the first layer;
b) lowering the liner into the manhole and causing a portion of the liner to extend therefrom;
c) sealing the liner portion;
d) simultaneously admitting heated, pressurized air and steam into the liner so that the liner inflates and the second layer engages the walls of the manhole; and
e) continuing to admit heated, pressurized air and steam into the liner for a period sufficient to cure the resin in the layers.

14. The method of claim 13, including the step of:
a) admitting the steam and air into the liner through a common conduit.

15. The method of claim 14, including the step of:
a) providing a conduit having a discharge for the air and steam proximate the bottom of the manhole.

16. The method of claim 13, including the step of:
a) causing the air to be supplied by a regenerative blower system which simultaneously heats the air to a temperature in excess of the boiling point of water.

17. The method of claim 13, including the step of:
a) inflating the liner to a pressure between about 500 to about 1500 pounds per square foot.

18. The method of claim 17, including the step of:
a) admitting the air at a velocity sufficient to create extreme turbulence within the inflated liner.

19. The method of claim 13, including the steps of:
a) terminating the air and steam flow to the liner after sufficient cure of the resin has occurred;
b) removing accumulated condensate; and
c) removing the bladder from the cured first layer.

* * * * *